United States Patent [19]

Wallis

[11] Patent Number: 4,583,722
[45] Date of Patent: Apr. 22, 1986

[54] NITROGEN DIE CYLINDER

[76] Inventor: Bernard J. Wallis, 25315 Kean Ave., Dearborn, Mich. 48124

[21] Appl. No.: 611,471

[22] Filed: May 17, 1984

[51] Int. Cl.$^4$ ............................. F16F 9/02; F16J 15/32
[52] U.S. Cl. ................................. 267/119; 267/130; 277/27; 277/110; 277/165; 277/205
[58] Field of Search ................. 267/64.11, 64.28, 118, 267/119, 126, 127, 130; 92/168; 188/322.17, 322.18; 277/3, 103, 123, 124, 125, 27, 110, 165, 205

[56] References Cited

U.S. PATENT DOCUMENTS

| | | | |
|---|---|---|---|
| 3,079,897 | 3/1963 | Kirsch | 267/119 X |
| 3,577,833 | 5/1971 | Skelton | 92/168 |
| 3,947,005 | 3/1976 | Wallis | 267/119 |
| 4,342,448 | 8/1982 | Wallis | 267/64.28 X |

FOREIGN PATENT DOCUMENTS 968825  6/1975  Canada .............................. 277/124

Primary Examiner—Bruce H. Stoner, Jr.
Assistant Examiner—Richard R. Diefendorf
Attorney, Agent, or Firm—Barnes Kisselle Raisch Choate Whittemore & Hulbert

[57] ABSTRACT

There is disclosed a piston-cylinder assembly for use as a die spring wherein one end of the cylinder is connected to the source of nitrogen at high pressure to bias the piston outwardly through the opposite open end of the cylinder. The open end of the cylinder is provided with a high pressure seal and the opposite end of the piston is likewise provided with a high pressure seal. An annular chamber of relatively small cross sectional area is provided between the piston and the cylinder. A valve stem on the piston controls a passageway communicating with the annular chamber. Axial pressure is applied to the seal on the cylinder to produce firm sealing engagement with the piston by pressurizing the annular chamber or by arranging a compression spring between the seal and a shoulder on the cylinder.

4 Claims, 6 Drawing Figures

NITROGEN DIE CYLINDER

This invention relates to nitrogen die cylinders.

In press operations it is common practice to employ die springs in the form of fluid cylinders filled with or connected to a source of nitrogen under relatively high pressure. The nitrogen pressure frequently employed is 1000 psi or more so that a relatively small diameter cylinder is capable of exerting a substantially large force. Although the high nitrogen pressure is desirable from the standpoint of the compactness of the cylinders, it does give rise to problems relating to sealing of the piston within the cylinder. The sealing problem is also aggravated by the fact that the environment around a die in a press is frequently contaminated with oil, dirt, grinding dust, etc. which, if permitted to leak into the cylinder, can cause serious problems in a relatively short period of time.

Seals have been developed for use on nitrogen die cylinders which operate quite effectively when they are subjected to relatively high axial pressure. However, such seals are frequently not entirely effective to prevent the ingress of contaminants into the cylinder when they are exposed to relatively low pressure. Sealing problems frequently arise because the gas pressure to which one or more of the seals are subjected may vary between relatively high and low values due to the rapid reciprocation of the piston. The reciprocating rate of the piston depends upon the speed of the press. On the upward stroke of a rapidly operating press the gas pressure at one side of a seal may be very low or even subatmospheric because of the sudden expansion in volume of a chamber in the cylinder directly adjacent the seal. When this occurs there is a likelihood that contaminants may leak past the seal into the cylinder.

The present invention has for its primary object the provision of a nitrogen die cylinder employing seals designed to resist leakage under relatively high pressure, the cylinder also employing means for subjecting the seals to relatively high pressures at all times regardless of the rate at which the piston is reciprocated.

A further object of this invention is to provide a piston-cylinder unit adapted for use as a die spring which can be charged to a desired high degree of pressure before assembly with the die.

Another object of the invention is to provide a nitrogen die cylinder having a valve thereon which permits the pressure in the cylinder to be relieved safely when necessary for servicing the cylinder.

Still another object of this invention is to provide a dual set of seals for a nitrogen die cylinder arranged to enable continued operation of the cylinder when one of the seals develops a leak or otherwise fails.

Further objects, features and advantages of the present invention will become apparent from the following description and accompanying drawings, in which.

Figure 1:
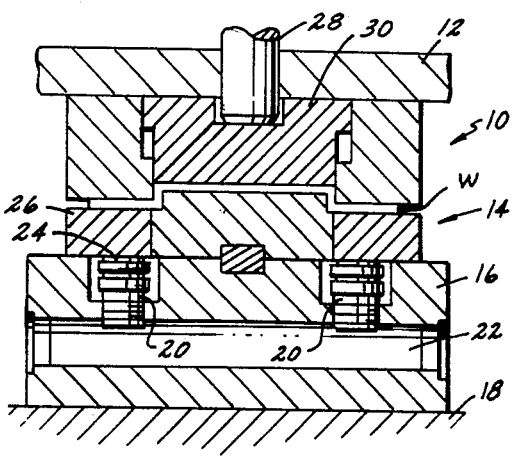
FIG. 1 is a vertical sectional view of a conventional die arrangement employing die springs in the form of nitrogen die cylinders.

A somewhat conventional die arrangement is illustrated in FIG. 1 wherein an upper die 10 is secured to a plate 12 which reciprocates vertically with the press ram (not shown). A lower die 14 is mounted on a nitrogen manifold 16 supported on the bolster 18 of the press. A pair of nitrogen die cylinders 20 are mounted on manifold 16, the lower ends of the cylinders communicating with the manifold passageway 22 which is charged with nitrogen at about 1000 psi. Each of the cylinders 20 has a piston 24 therein which is biased upwardly against a movable pad section 26 of the lower die. In the arrangement illustrated in FIG. 1 a piston rod or an extension pin 28 of a similar nitrogen die cylinder mounted to reciprocate with the press ram bears downwardly against a vertically movable pad section 30 of the upper die 10. As the ram of the press approaches the bottom of its stroke the pad sections 26,30 are displaced vertically against the bias of the pistons acting on these pads so that the workpiece W is formed as shown in FIG. 1.

Figure 2:
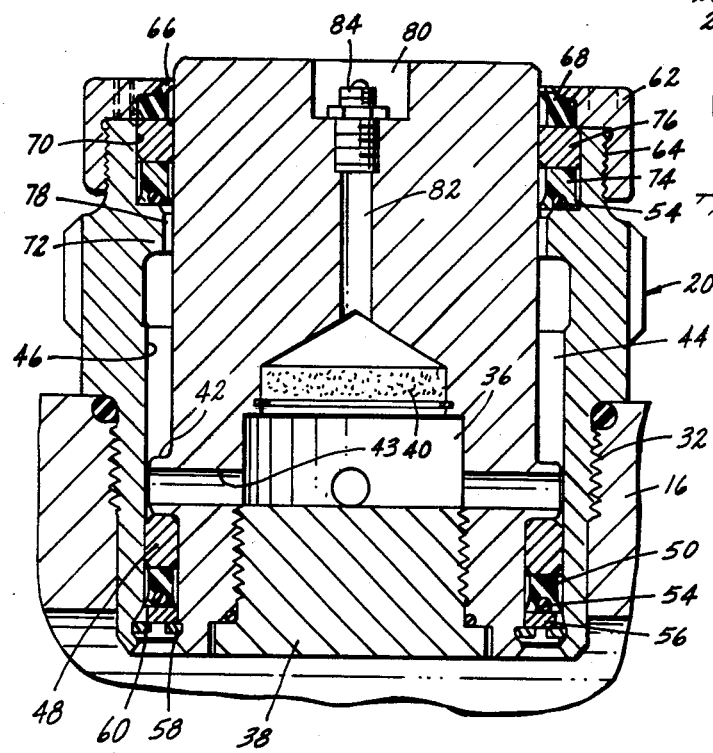
FIG. 2 is a vertical sectional view of one form of nitrogen die cylinder according to the present invention.

A die cylinder 20 according to the present invention is shown in FIG. 2. The cylinder is externally threaded as at 32 for sealed engagement with a port in the manifold 16. The piston 24 is formed with a chamber 36 which extends to the lower end of the piston and is closed by a threaded plug 38. Within chamber 36 there is arranged an oil saturated wick 40. Piston 24 is provided with a radially enlarged shoulder 42 which is cross drilled as at 43 so as to establish communication between chamber 36 and the annular chamber 44 between the outer periphery of piston 24 and the bore 46 of cylinder 20. The lower side of shoulder 42 is abutted by a fiber piston ring 48 and below piston ring 48 there is arranged a high pressure cup type gas seal 50. Seal 50 is formed of a rubber composition and has a pair of downwardly and outwardly flaring lips 52 between which is arranged a rubber O-ring 54. The loWer face of seal 50 seats on a compression washer 56. A snap ring 58 adjacent the lower end of piston 24 retains ring 48, seal 50 and compression washer 56 in loosely assembled relation on the piston. A snap ring 60 at the lower end of cylinder bore 46 limits the retraction stroke of the piston within the cylinder.

A cylinder cap 62 is threaded, as at 64, over the upper end of cylinder 20. Cap 62 is formed with an annular recess 66 in which a rod wiper 68 is seated. Rod wiper 68 is constructed and functions in substantially the same manner as the rod wiper shown and described in U.S. Pat. No. 4,342,448.

The upper end of cylinder 20 is formed with a counterbore 70, the lower end of which is defined by a shoulder 72 on which is seated an annular high pressure seal 74. Seal 74 may be constructed the same as seal 50 at the lower end of the cylinder. Seals 74 and 50 are arranged with their open ends facing the lower end of the cylinder. Between seal 74 and rod wiper 68 there is arranged in counterbore 70 a bronze bushing 76 having a sliding fit with the counterbore 70 and also a sliding fit with the outer periphery of piston 24. The inner diameter of shoulder 72 is at least slightly greater than the outer diameter of piston 24 so as to provide an annular clearance space 78 therebetween.

Figure 3:
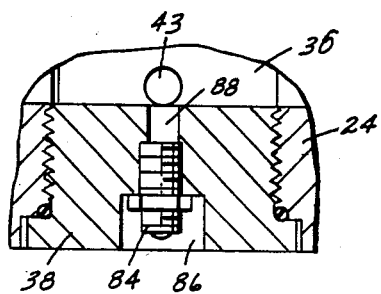
FIG. 3 is a fragmentary sectional view of a slightly modified cylinder arrangement according to the present invention.

The upper end of piston 24 is formed with a recess 80 which communicates with chamber 36 by way of a passageway 82. A conventional valve stem 84 of the type used on automobile tires, for example, is threaded into passageway 82. If desired, instead of mounting valve stem 84 at the upper end of the piston, it may be mounted within a recess 86 in plug 38 which communicates with chamber 36 by way of a passageway 88 (FIG. 3).

In operation chambers 36 and 44 are charged with nitrogen through valve stem 84 to a pressure somewhat less than the pressure in manifold 16. For example, if the pressure of the nitrogen in manifold 16 is at about 1000 psi, then chambers 36,44 can be pressurized to about 400 to 500 psi. The pressure in chamber 44 acting against the open lower end of seal 74 and the pressure in manifold 16 acting against the lower open end of seal 50 will maintain the lips of these seals in firm sealing engagement with the outer periphery of the piston and the respective bores of the cylinder at all times. Even though the pressure within chamber 44 may be as high as 400 to 500 psi, the cross sectional area of this chamber is relatively small (perhaps one-fifth or less of the effective cross sectional area of the piston). Thus, the effective upward force produced by the piston is not substantially dimished by the pressure of the nitrogen in chamber 44. The pressure in chambers 44 and 36 is sufficiently high such that, when the piston is displaced downwardly rapidly by vertical movement of the die section 26, the pressure in chamber 44 might be reduced slightly due to the rapid expansion of the volume of this chamber, but the reduction in pressure will not be sufficiently great to affect the sealing engagement of the lips 52 of seal 74 with the outer periphery of piston 24 and the inner periphery of counterbore 70. Thus, even though piston 24 may be reciprocated very rapidly, the pressure in annular chamber 44 will maintain seal 74 in excellent sealing relationship with piston 24 and cylinder 20 and eliminate the tendency for any surrounding contaminants (such as oil, dirt, grinding dust, etc.) to be sucked into the cylinder past seal 74. On the other hand, if the pressure in chamber 44 were only slightly above atmospheric, then the downward rapid stroke of piston 24 would tend to create a vacuum and suck in contaminants through wiper 68 and seal 74 into annular chamber 44.

It will also be appreciated that by providing seals such as illustrated at 50 and 74 both at the upper end of cylinder 20 and the lower end of piston 24 a very reliable nitrogen die cylinder is provided. In the event that seal 50 should leak or otherwise fail, the pressure of the nitrogen will not leak out of the cylinder by reason of seal 74. Likewise, if seal 74 should leak or otherwise fail, the manifold pressure will be retained by seal 50.

Figure 4:
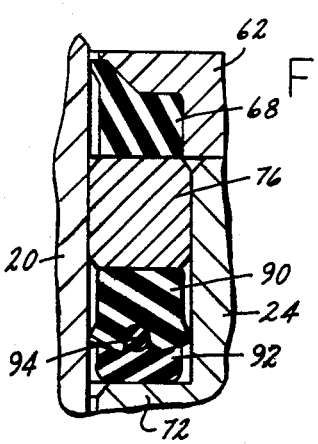
FIG. 4 is a fragmentary sectional view showing a slightly different sealing arrangement from that illustrated in FIG. 2.

When fluid pressure is applied to the lower faces of seals 50,74, the O-ring 54 is compressed and the lips of the seals are flared outwardly to produce the sealing action. However, when fluid pressure is applied to the upper faces of these seals the compression force on the O-ring is not substantial and leakage past the seals may occur. In FIG. 4 there is illustrated a seal which is substantially more effective regardless of the direction in which fluid pressure is applied thereto. The seal comprises a conventional sealing ring 90 similar to seals 50 and 74 and, in addition, a sealing ring 92 disposed against the lower open face of seal 90 with the central portion thereof bearing against the O-ring 94. With this arrangement When fluid pressure is applied against the top face of seal 90, the central portion of ring 92 compresses O-ring 94 which, in turn, transmits a laterally outward force to the sealing lips. Therefore, the seal arrangement shown in FIG. 4 provides excellent high pressure sealing characteristics regardless of the direction of application of the pressure against the seal. For this reason the arrangement shown in FIG. 4 is admirably suited for use at the upper end of the cylinder. Since the arrangement of seal 90 and ring 92 effectively seals in both directions, it follows that the arrangement may also be inverted relative to the orientation shown in FIG. 4. The inverted position may be even more desirable in the event the user fails to charge chamber 36 with nitrogen.

Figure 5:
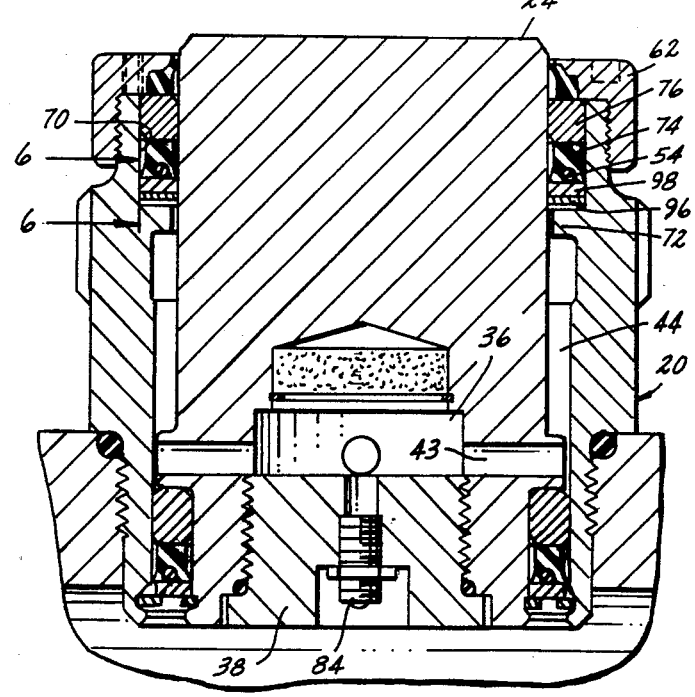
FIG. 5 is a view similar to FIG. 2 and showing a modified construction.
Figure 6:
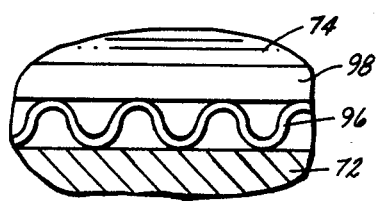
FIG. 6 is a fragmentary sectional view taken along the lines 6—6 in FIG. 5.

The cylinder arrangement shown in FIGS. 5 and 6 is generally the same as that shown in FIGS. 2 and 3 except that an annular spring 96 is seated on shoulder 72 and between spring 96 and the lower open face of seal 74 there is arranged a flat annular spacer 98. Spring 96 is in the form of an annular leaf spring which is radially corrugated so as to be axially compressible. The degree to which spring 96 is compressed is determined by the extent to which cap 62 is threaded downwardly on the upper end of cylinder 20. In use the spring 96 is compressed sufficiently to apply the necessary upward force on O-ring 54 to maintain the lips of seal 74 in firm sealing engagement with the outer periphery of the piston 24 and with counterbore 70 at all times regardless of whether chambers 36 and 44 are pressurized. Thus, with the arrangement shown in FIGS. 5 and 6 the cylinder unit may be assembled with the die and manifold without positively pressurizing chambers 36,44. However, it will be appreciated that these chambers will at least initially be filled with air. It is desirable in any event to provide the valve stem 88 at either the upper or the lower end of the piston because, over a long period of time, nitrogen from within the manifold may eventually leak into chambers 36,44. Thus, in the various embodiments described the provision of the manually operable valve stem 84 is desirable not only for the purpose of pressurizing these chambers, but also in order to relieve any pressure obtaining in these chambers when it becomes necessary to disassemble the piston from the cylinder for servicing purposes.

The terms "upper" and "lower" as used herein refer to relative positions when the cylinder unit is oriented in the illustrated position. It will be understood, of course, that the cylinder unit, when mounted to reciprocate with the ram, will be inverted relative to the illustrated orientation. Therefore, in the description and claims the term "upper" is used to designate the end of the cylinder through which the piston projects and the term "lower" is used to designate the end of the cylinder to which the high pressure nitrogen is applied.

I claim:

1. In combination a manifold having a pressurized nitrogen chamber for applying a biasing force to a die member that is vertically displaceable in response to vertical reciprocation of the plate of a press in which the die member is mounted, a cylinder mounted on said manifold, said cylinder having a bore, the lower end of which communicates with the pressurized chamber of the manifold, a piston slideably mounted in said bore and biased upwardly therein by the manifold pressure at the lower end thereof, the lower end portion of the piston having a lower, bottom high pressure annular seal thereon engaging said bore, the portion of the piston above said bottom seal being of a reduced smaller diameter than said bore so as to define therebetween an annular chamber having a cross sectional area substantially smaller than the cross sectional area of the piston, said cylinder having an opening at its upper end through which the reduced diameter portion of the piston projects, an upper annular high pressure seal in said opening engaging the outer periphery of the reduced diameter portion of the piston, said piston having a central chamber therein communicating with said annular chamber, said lower seal preventing communication of said annular and central chambers with said manifold chamber and said upper seal preventing communication of said annular and central chambers with the atmosphere surrounding the cylinder, said seals being of the type whose sealing characteristics are enchanced when subjected to relatively high axial pressures in an upwardly direction and means for constantly applying an axial upward pressure to said upper seal at a value below the pressure in the manifold chamber.

2. The combination called for in claim 1 wherein said means for applying said axial upward pressure to the upper seal comprises a passageway in said piston extending from the exterior thereof to said central chamber and a manually operable valve in said passageway to said chamber for opening and closing the passageway for enabling pressurizing said central and annular chambers with a gaseous fluid.

3. The combination called for in claim 1 wherein siad means for applying an upward axial pressure to the upper seal comprises an axially compressible annular spring bearing axially against the lower side of the upper seal.

4. The combination called for in claim 3 wherein said bore has a radially inwardly extending annular shoulder adjacent the upper end of said cylinder, a cap threaded over the upper end of the cylinder, said upper seal and said spring being arranged in axially compressed relation between said cap and said shoulder.

* * * * *